Figure 1:
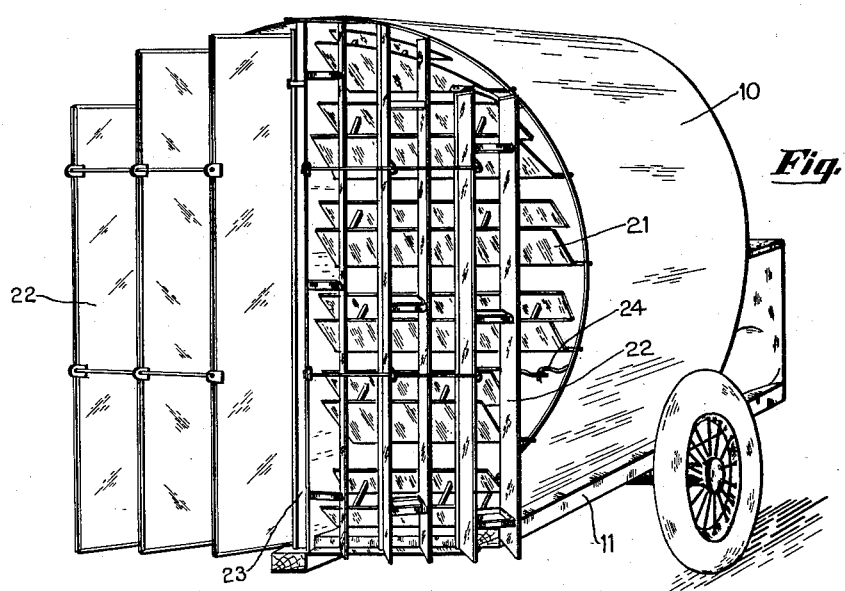

Nov. 5, 1940.                G. W. DAUGHERTY                2,220,082
SPRAYING AND DUSTING MACHINE
Original Filed Oct. 8, 1936     2 Sheets-Sheet 1

INVENTOR.
G. W. Daugherty
BY
ATTORNEY

Nov. 5, 1940.   G. W. DAUGHERTY   2,220,082
SPRAYING AND DUSTING MACHINE
Original Filed Oct. 8, 1936   2 Sheets-Sheet 2
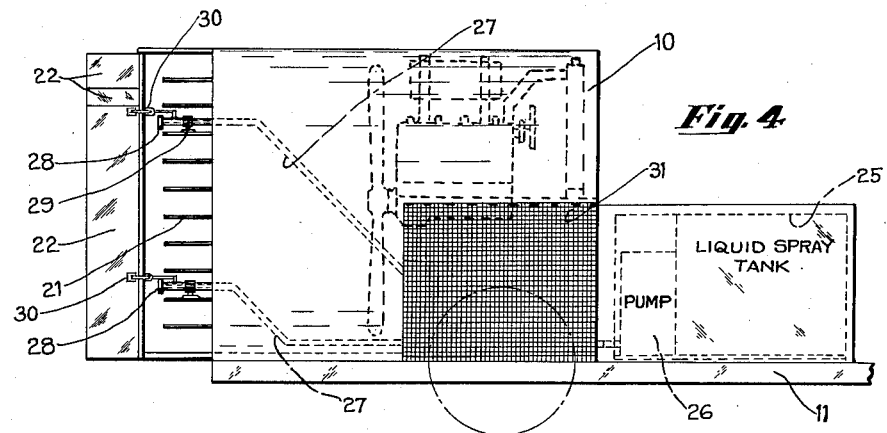
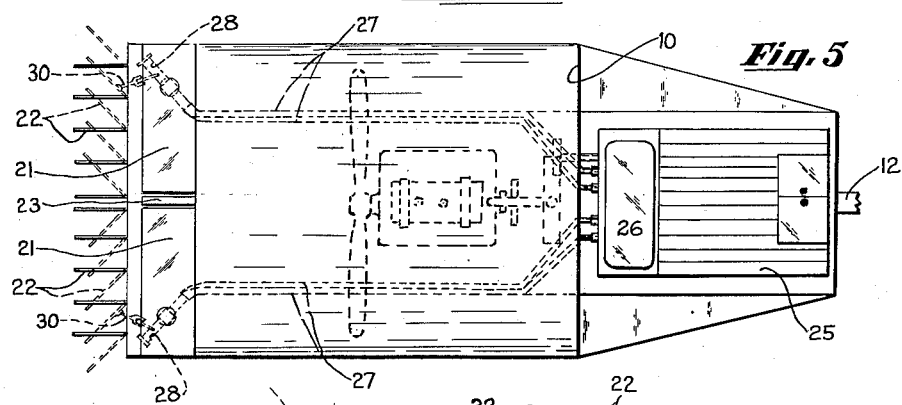
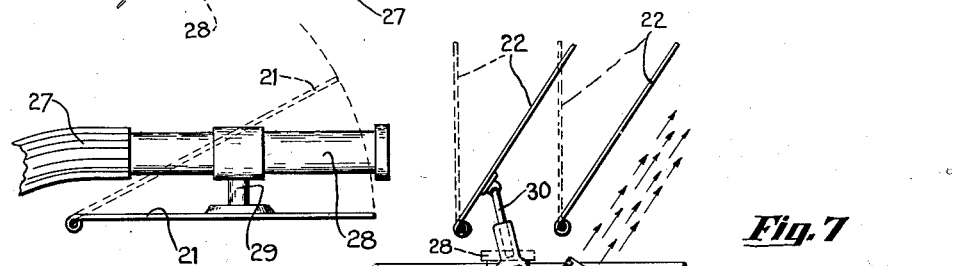
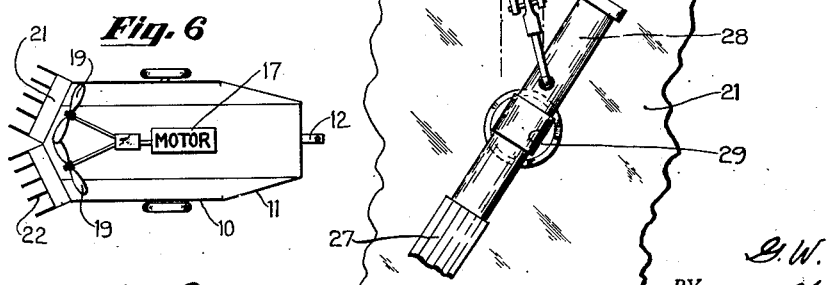
INVENTOR.
G. W. Daugherty
BY
ATTORNEY Patented Nov. 5, 1940

2,220,082

UNITED STATES PATENT OFFICE 2,220,082

SPRAYING AND DUSTING MACHINE

George W. Daugherty, Orlando, Fla.

Application October 8, 1936, Serial No. 104,573
Renewed July 12, 1939

17 Claims. (Cl. 43—148)

This invention relates to a spraying and dusting machine. Machines of this type are used for spraying and dusting fruit trees and crops of various types in order to destroy insect pests.

At the present time, in spraying and dusting, there is generally employed a hopper or spray tank which contains the dusting or spraying material, some sort of power means being adapted to supply the dusting or spraying material to a nozzle on the end of a hose. An operator holds the hose, and the material issues from the hose under considerable pressure and is sprayed over the trees and crops. In other types of apparatus, a sheet metal duct may be substituted for the hose and held fixed in a preferred spraying or dusting position.

This method of spraying and dusting is unsatisfactory since it is impossible to obtain an even distribution of the material. Also, it is practically impossible to utilize the same apparatus for spraying both high and low trees, and at the same time spraying delicate plants of all sorts. Similarly, the method of spraying and dusting thus generally described is deficient in that it is rather slow, since the material issues from the hose in a rather compact stream, as will be readily appreciated.

The various deficiencies indicated have been recognized, and of late, airplanes have in many cases been used for dropping dusting and spraying material on fields having growing crops, and over orchards of fruit trees. Naturally, this method of spraying may only be employed by very large producers, and even there, it is not extremely satisfactory, since an airplane travels at a great speed so that it is impossible to exercise any substantial control over the spreading of the material.

My invention provides means for spraying or dusting, as the case may be, in which the material is sent forth in the form of a very fine fog or mist, so that a very uniform distribution of the dusting or spraying material is obtained. At the same time, my invention provides a means for directing the flow of the dusting and spraying material so that I am able to dust and spray very high trees, or low trees, or growing crops in fields.

Before describing in detail my invention, it may be well to indicate its general construction. The basic feature of my invention embodies a means for creating an air blast, preferably over a relatively large area, such as might be possible in an air tunnel; and feeding a supply of spraying or dusting material into this air blast so that it may be picked up by the air blast and formed into a fine fog of dusting or spraying material, as the case may be.

For carrying out my invention, I utilize an air tunnel in which an internal combustion engine drives a large airplane propeller of considerable size. Where dusting is required, I utilize a hopper containing dusting material, and I provide a fan for blowing the dusting material through a hose and out through a nozzle which is placed with its open mouth in the path of the air blast formed by the propeller. The nozzle is preferably pointed in the same direction as the blast of air, so that the dusting material shoots out of the nozzle in a substantial stream and is picked up by the air blast and formed into a fine fog of dusting material.

In the case of the spraying material, I utilize a tank carrying the liquid spraying material, a pump being adapted to pump the liquid under pressure through a hose and through a nozzle also placed with its open end in front of the air blast.

It will readily be appreciated that in either case, the strong air blast picks up the material as it is delivered at the end of the nozzle and forms it into a fine fog of material. It will be readily appreciated that by varying the location of the open end of the nozzle relatively to the air blast, the consistency of the fog may be changed. It is also possible to change the consistency of the fog of material formed by the air blast by decreasing or increasing the flow of material from the hopper or tank, as the case may be, or the pressure behind it.

As a further extremely important feature of my invention, I utilize means for directing the air blast and therefore the direction of the fog of material formed thereby. Such means preferably embody a series of elevators and guide fins pivoted to the end of the tunnel and movable in the manner of airplane fins and elevators, so as to direct the flow of material. In the case of the spraying material, especially, I prefer to mount the nozzles so that they move with the elevators, thus facilitating the control of the direction of the flow of the material. As a matter of fact, I prefer also to connect the nozzles to the directional fins so that the nozzles may pivot to the right and left while also moving to an inclined upward position with the elevators.

As a further feature of the invention, I provide means for breaking up the material carried by the air blast so as to assist in forming a very fine fog or mist, a preferred way of doing this being to place a wire screen in front of the fins and elevators, and through which wire screen the material must pass.

As still a further feature of my invention, I provide means tending to make uniform the air blast, especially where some obstructing object is positioned behind the fan or propeller so as to prevent the fan receiving a uniformly distributed supply of air, thus setting up a vacuum condition. The means for regulating the air blast so as to render it uniform in consistency comprises preferably a pair of vertical guides which straighten out the air blast, and by straightening out the air blast, make it relatively uniform over the area of the air tunnel.

Further objects of the invention and valuable features thereof will of course appear upon a reading of the detailed description of my invention which follows.

For describing in detail my invention, I shall refer to the drawings wherein Fig. 1 is a perspective view taken from the rear of a vehicle carrying a preferred embodiment of my invention. Fig. 2 is a diagrammatic side view of various parts of my invention. Fig. 3 is a partial section and plan view of Fig. 2 with most of the parts removed therefrom. Fig. 4 is an elevation of a modification of my invention utilizing a liquid spray, while Fig. 5 is a plan view of the parts of Fig. 4. Fig. 6 is a detailed view showing how the spray nozzle moves with the elevators, while Fig. 7 shows how the spray nozzle is connected for pivoting movement with the guide fins. Fig. 8 is a modification.

Referring now more particularly to the drawings and especially to Fig. 1, reference numeral 10 indicates a wind tunnel formed of metal and supported on a trailer chassis 11 adapted to be pulled by a vehicle to which it may be secured by a coupling 12, shown in Fig. 2. In Fig. 2, the apparatus carried at the front end of the trailer chassis 11 and in the wind tunnel is illustrated diagrammatically.

The apparatus of Fig. 2 is used for dusting and comprises a hopper 13 of a standard type now being manufactured for use in dusting. This hopper has attached thereto a fan 14 which acts through a hose 15 to supply material to each of a pair of nozzle openings 16. For driving the fan 14, I use an internal combustion engine 17 which is connected through belt 18 and various gear mechanisms with the fan 14, as will be readily appreciated. The engine 17 also drives an airplane type of propeller 19 which forms a powerful blast of air in the air tunnel 10.

Vertical guides 20 are positioned in the air tunnel and act to straighten the flow of air from the propeller 19. Where the air is unevenly supplied to the propeller 19, due to the positioning of obstructing elements in the air path, thus acting in effect to set up a vacuum behind the fan, there is naturally a tendency for the air stream formed by the propeller 19 to be uneven. This condition may also cause the air blast to assume a direction at an angle to the air tunnel itself, and the guides 20 are extremely helpful in straightening out the air flow, therefore.

It will be readily appreciated that the air blast formed by the propeller 19 will pick up the dusting material supplied by nozzles 16 and will form it into a relatively fine fog of material. Certainly, it will be appreciated that the fog of material will be of a very fine and uniform character in view of the cross sectional area of the blast, as against the distribution of material which would be possible were the nozzles 16 used alone, as is the case today in the art. By varying the distance of the open mouth of the nozzles 16 from the propeller 19, the consistency of the fog may be varied. Also, the consistency of the fog may be varied by varying the size of the nozzles 16 and the speed of the feeding of the material through the nozzles by the fan 14. For further breaking up the air blast and for further distributing the material carried thereby, I utilize a wire screen shown in the drawings, the operation thereof being quite clear to those skilled in the art.

In order to control the direction of the air blast and the fog of material, the tunnel 10 may be pivoted on the chassis in much the manner of a search light. I find, however, that I can obtain practically all of the directional control I require by utilizing a series of direction fins and guides and by a series of elevators. The elevators are designated by reference numeral 21 and are moved much as airplane elevators, by proper controls. Preferably, all the elevators move as one unit.

In my machine, it is possible to spray two parallel rows of trees when the machine is pulled between the rows. This type of spraying is possible in the machine through the utilization of two series of guide fins 22, one series on one side of the machine, and the other series on the other side of the machine, a stationary guide 23 being placed in the center of the air tunnel. These guide fins are operated through a proper control and may be set in any particular desired position. Reference numeral 24 shows a type of control which may be utilized. In addition, there being two sets of these fins 22, one set will guide part of the air stream in one direction, while the other set guides another part of the air stream in another direction. By increasing the number of fins, greater control may be obtained over the air stream.

In Fig. 2, I illustrate how the elevators 21 may pivot upwardly from their full line position to their dotted line position. In Fig. 3, I show how the guide fins 22 may pivot from a full line position to a dotted line position to direct the air stream.

In Figs. 4 and 5, I illustrate an embodiment of my invention in which a liquid spray is utilized. The spray is contained in a tank 25 and is pumped by a pump 26, through a series of hose 27 to nozzles 28. While I do not show a propeller in Figs. 4 and 5, it is understood that there is a propeller in Figs. 4 and 5 which generates an air blast which picks up the spray material delivered at the end of the nozzle 28 and forms it into a fine mist or fog, just as in the modification of Figs. 1, 2 and 3. Elevators 21 and guide fins 22 are utilized in the modification of Figs. 4 and 5, just as in Figs. 1, 2 and 3. However, I prefer to mount the nozzles 28 directly on the elevators 21 so that the nozzles may pivot with the elevators as is best illustrated in Fig. 6, from a full line position to a dotted line position.

The nozzles 28 are secured to the elevators 21 through rotating shafts 29 so that the nozzles may rotate relatively to the elevators 21 to assume positions parallel to the guide fins 22, as is best illustrated in Fig. 7. Through a universal connecting means 30, shown diagrammatically in Fig. 7, it is possible to connect the nozzles 28 to the guide fins 22 for positioning the nozzles parallel to the guide fins, as is illustrated in Fig. 7. This assists in controlling the directional flow of the material, as will be readily appreciated. Of course, the nozzles may otherwise be set in proper directional positions, as will be appreciated.

Figure 2:
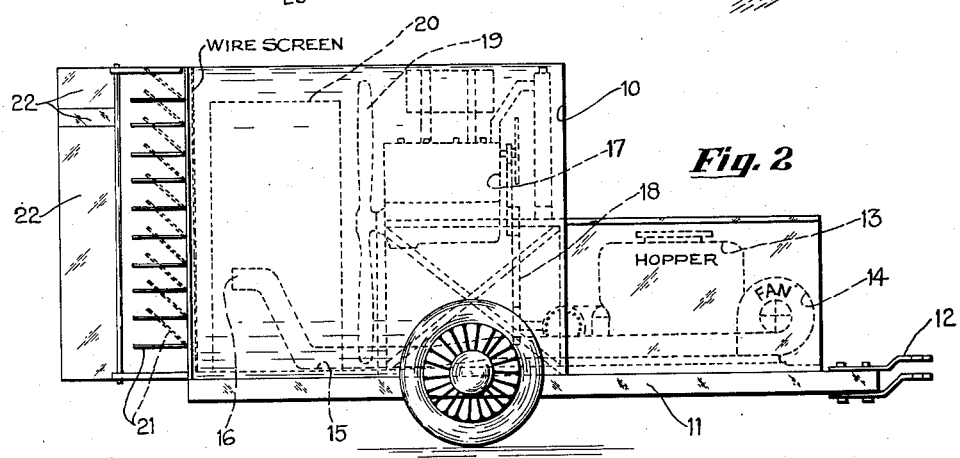
Figure 3:
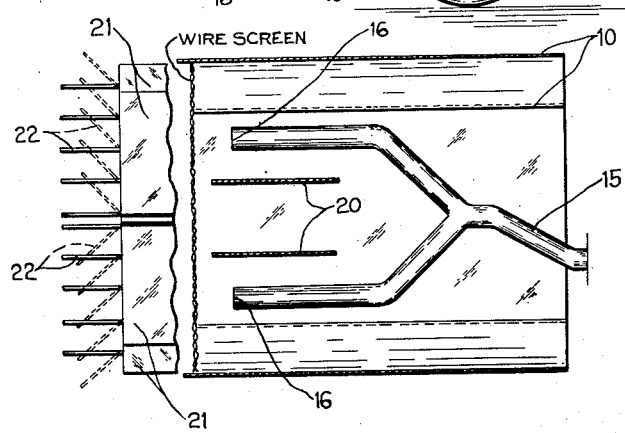

In Fig. 4, I illustrate a screen 31 which is utilized to protect the apparatus thereunder while allowing a free flow of air. In Fig. 2, I show the internal combustion engine 17 placed in front of the propeller 19. It will be readily appreciated that the propeller may be placed in front of the engine so as to make it possible for the air blast to cool the motor, this being a desirable feature, especially in warm climates.

In Fig. 8, I illustrate a modified form of my invention in which two propellers 19 are used in order to cover a larger area. These are placed at an angle to one another, preferably 45°. They are driven from the same motor 17 through suitable gearing, so that the propeller blades will intermesh but will not hit one another. For controlling the air blasts generated, I intend using the same types of fins 22 and elevators 21 as in my first modification.

Having now described my invention generally, and two preferred embodiments thereof in detail, I should like to indicate that further modifications of my invention will readily occur to those skilled in the art. Therefore, I do not wish to be limited in my patent monopoly except as is required by the state of the art.

I now claim:

1. In a spraying and dusting machine of the class described, an air tunnel, means for creating and forming an air blast through said tunnel, and a second means for delivering a continuous supply of powdered or liquid material to said tunnel at a point in said tunnel on the discharge side of said air blast creating and forming means whereby said air blast blows said material outwardly of said tunnel in the form of a fine fog.

2. In a spraying and dusting machine of the class described, an air tunnel having an exhaust end, a propeller adapted to create an air blast in said tunnel in the direction of said exhaust end, pressure means including a nozzle for delivering a continuous supply of spray material into the path of said air blast where it will be picked up by said air blast and formed into a fine fog of material, a series of guide fins and elevators pivotally mounted at the exhaust end of the tunnel for directing the said air blast and the fog of material formed thereby, and means for securing said nozzle for movement with said elevators so as to direct the flow of spray material in a direction parallel to said elevators.

3. In a spraying and dusting machine of the class described, an air tunnel having an exhaust end, a pair of propellers set at an angle to one another and each adapted to create an air blast in said tunnel in the direction of said exhaust end, pressure means for delivering a continuous supply of spray or dusting material into the paths of said air blasts where it will be picked up by said air blasts and formed into a fine fog of material, a series of guide fins and elevators pivotally mounted at the exhaust end of the tunnel for directing the said air blasts and the fog of material formed thereby.

4. In a spraying and dusting machine of the class described, an air tunnel of relatively larger area, means for creating air blast through said tunnel and over the entire large area of said air tunnel, a relatively small passage through which material may be fed into said air tunnel, said passage terminating in said tunnel at a point on the discharge side of said air blast and where said air blast is diffused over substantially the entire area of said air tunnel, and means for feeding spraying material through said passage to said point of the air tunnel, whereby said diffused air blast will blow said material out of said tunnel in the form of a fine fog.

5. In a spraying and dusting machine of the class described, a vehicle, an air tunnel of relatively large area mounted on said vehicle, a propeller of airplane type and size mounted in said tunnel and adapted to create an air blast diffused over the entire area of said air tunnel, means for feeding spraying material to said air blast at a point on the discharge side of said air blast and after said air blast has been diffused over substantially the entire area of said air tunnel, whereby said air blast will pick up said material and form it into a fine fog of material, and a series of guide fins mounted on the exhaust end of said air tunnel for guiding the flow of said air blast out of said tunnel and therefore the flow of said fine fog of material.

6. In a machine of the class described, an air tunnel of relatively large cross sectional area, a propeller of the type and size used in commercial airplanes mounted in a portion of said air tunnel for creating an air blast through said tunnel, means for delivering a continuous supply of powdered material to the said air blast at the discharge side of said tunnel, whereby said air blast will pick up said material and form it into a fine fog, and a series of guide fins mounted on the exhaust end of said air tunnel for guiding the flow of said air blast out of said tunnel and therefore the flow of said fine fog of material.

7. In a spraying and dusting machine of the class described, an air tunel of relatively large area, an air propeller of a size substantially the diameter of the effective area of said air tunnel, means mounting said propeller for rotation on an axis substantially concentric with the longitudinal axis of said air tunnel, a relatively small passage through which spraying or dusting material is fed into a forward position relatively to said air propeller whereby the blast of air formed by said air propeller will form said material into a fine fog of material, and means for feeding said material through said passage.

8. In a spraying and dusting machine of the class described, an air tunnel of relatively large area, an air propeller of substantially the same size as the diameter of said air tunnel, means mounting said propeller for rotation on an axis substantially concentric with the longitudinal axis of said air tunnel, a series of deflector guides at the exhaust end of said tunnel for directing the air blast formed by said air propeller, a relatively small passage through which spraying or dusting material is fed into a forward position relatively to said air propeller whereby the blast of air formed by said air propeller will form said material into a fine fog of material, and means for feeding said material through said passage.

9. In a spraying and dusting machine of the class described, an air tunnel of relatively large area, an air propeller of substantially the same size as the diameter of said air tunnel, means mounting said propeller for rotation on an axis substantially concentric with the longitudinal axis of said air tunnel, a series of deflector guides at the exhaust end of said tunnel for directing the air blast formed by said air propeller, air straightening baffles mounted in said tunnel in planes parallel to the longitudinal axis of said tunnel and between said propeller and said deflector guides, a relatively small passage through which spraying or dusting material is fed into a forward position relatively to said air propeller whereby the blast of air formed by said air propeller will form said material into a fine fog of material, and means for feeding said material through said passage.

10. In a spraying and dusting machine of the class described, an air tunnel of relatively large area, an air propeller of substantially the same size as the diameter of the effective area of said air tunnel, means mounting said propeller for rotation on an axis substantially concentric with the longitudinal axis of said air tunnel, a series of deflector guides at the exhaust end of said tunnel for directing the air blast formed by said air propeller, a relatively small passage through which spraying or dusting material is fed into a forward position relatively to said air propeller and outwardly of said tunnel whereby the blast of air formed by said air propeller will form said material into a fine fog of material, and means for feeding said material through said passage.

11. In a spraying and dusting machine of the class described, an air tunnel of relatively large area, means for creating an air blast through said tunnel, a series of air deflectors and guides mounted at that end of said tunnel through which the blast of air leaves said tunnel and whereby said blast of air is guided, means for adjusting at least certain of said deflector guides, a relatively small passage through which spraying or dusting material is fed into a position forwardly of said air blast creating means, whereby to be formed by said air blast into a fine fog of material, and means for feeding said material through said passage.

12. In a spraying and dusting machine of the class described, an air tunnel of relatively large area, a propeller for creating an air blast through said tunnel, a series of air deflectors and guides mounted at that end of said tunnel through which the blast of air leaves said tunnel, means for adjusting at least certain of said deflector guides, air straightening baffles mounted in said tunnel in planes parallel to the longitudinal axis of said tunnel and between said propeller and said deflector guides, a relatively small passage through which material may be fed into a position forwardly of said propeller whereby to be formed by said air blast into a fine fog of material, and means for feeding said material through said passage.

13. In a spraying and dusting machine of the class described, an air tunnel of relatively large area, means for creating an air blast through said tunnel, a series of air deflectors and guides mounted at that end of said tunnel through which the blast of air leaves said tunnel, means for adjusting at least certain of said deflector guides, a fixed vertical vane at the vertical center of said air tunnel and additional vertical vanes to each side of said fixed vane adapted to divide the air blast in two parts, a relatively small passage through which material may be fed into a position forwardly of said air blast creating means whereby to be formed by said air blast into a fine fog of material, a storage container for said material, and means for feeding said material from said storage container through said passage.

14. In a spraying and dusting machine of the class described, an air tunnel of relatively large area, means for creating an air blast through said tunnel, a series of horizontal vanes at the end of said tunnel for deflecting the air blast horizontally, a series of vertical vanes at the end of said tunnel for deflecting the air blast vertically, means for adjusting at least certain of said vanes, a relatively small passage through which material may be fed forwardly of said air blast creating means whereby to be formed by said air blast into a fine fog of material, and means for feeding material through said passage.

15. In a spraying and dusting machine of the class described, an air tunnel of relatively large area, means for creating an air blast through said tunnel, a series of horizontal vanes at the end of said tunnel for deflecting the air blast horizontally, a series of vertical vanes at the end of said tunnel for deflecting the air blast vertically, means for adjusting at least certain of said vanes, a relatively small passage through which material may be fed forwardly of said air blast creating means and outwardly of said tunnel whereby to be formed by said air blast into a fine fog of material, and means for feeding material through said passage.

16. In a spraying and dusting machine of the class described, an air tunnel of relatively large area, means for creating an air blast through said tunnel, a series of horizontal vanes at the end of said tunnel for deflecting the air blast horizontally, vertical vanes at the end of said tunnel for deflecting the air blast vertically and positioned for dividing said air blast vertically into two air blasts, means for adjusting at least certain of said vanes, a relatively small passage through which material is fed into a forward position relatively to said air blast creating means whereby to be formed by said air blast into a fine fog of material, a storage container for said material, and means for feeding said material from said storage container through said passage.

17. In a spraying and dusting machine of the class described, an air tunnel of relatively large area, means for creating an air blast through said tunnel and over the entire large area of said air tunnel, a relatively small passage through which material may be fed to a point in front of said air blast creating means, said passage terminating at a point on the discharge side of said air blast where the material is picked up by said air blast and after said air blast has been diffused over substantially the entire area of said air tunnel, means for feeding spraying material through said passage and therefore to said point whereby said diffused air blast will pick up said material and form it into a fine fog of material, and a series of guide fins mounted on the exhaust end of said air tunnel for directing the flow of said air blast and therefore of said fine fog of material.

GEORGE W. DAUGHERTY.